United States Patent [19]

Kirsch et al.

[11] Patent Number: 4,816,911
[45] Date of Patent: Mar. 28, 1989

[54] HANDLING PROCESS AND INFORMATION STATION

[75] Inventors: Kerry F. Kirsch, Livonia; Robert J. Tindall, Romeo; Jerry Kirsch, St. Clair, all of Mich.

[73] Assignee: Kirsch Technologies, Inc., St. Clair, Mich.

[21] Appl. No.: 16,185

[22] Filed: Feb. 17, 1987

Related U.S. Application Data

[63] Continuation-in-part of Ser. No. 870,806, Jul. 5, 1986.

[51] Int. Cl.⁴ .............................................. H04N 1/04
[52] U.S. Cl. ................................... 358/256; 258/280; 258/286
[58] Field of Search ............... 388/256, 280, 286, 903; 379/100; 358/181

[56] References Cited

U.S. PATENT DOCUMENTS

| | | | |
|---|---|---|---|
| 3,731,282 | 5/1973 | Dancis et al. | 358/335 |
| 4,000,510 | 12/1976 | Cheney et al. | 360/33 |
| 4,028,733 | 6/1977 | Ulicki | 360/10 |
| 4,041,463 | 8/1977 | Slutzky et al. | 364/900 |
| 4,161,728 | 7/1979 | Insam | 340/750 |
| 4,315,323 | 2/1982 | Bronisz et al. | 360/74.1 |
| 4,319,339 | 3/1982 | Utzerath | 340/723 |
| 4,328,557 | 5/1982 | Gastinel | 340/750 |
| 4,333,160 | 6/1982 | Kobari et al. | 358/127 |
| 4,380,047 | 4/1983 | Eisenhard et al. | 364/200 |
| 4,420,818 | 12/1983 | Lee et al. | 364/900 |
| 4,422,105 | 12/1983 | Rodesch et al. | 358/903 |
| 4,423,448 | 12/1983 | Frandsen | 360/106 |
| 4,425,586 | 1/1984 | Miller | 358/335 |
| 4,519,003 | 5/1985 | Scholz | 358/335 |
| 4,530,048 | 7/1985 | Proper | 360/15 |
| 4,538,188 | 8/1985 | Barker et al. | 360/72.2 |
| 4,652,933 | 3/1987 | Koshiishi | 358/286 |

*Primary Examiner*—Edward L. Coles, Sr.
*Attorney, Agent, or Firm*—Harness, Dickey & Pierce

[57] ABSTRACT

The information station uses a computer for receiving, storing and transmitting digital electronic signals which represent digitized information corresponding to printed text or graphics. A facsimile transceiver is used to digitize the printed information and also used to reprint a hard copy from digital electronic signals received from the computer. The computer has a serial interface including a synchronous communication interface and modem for communicating with the facsimile transceiver. A switching circuit, responsive to the computer, switches between three switching states to selectively connect to modem to an external telephone line or to connect the facsimile transceiver to an external telephone line or to connect the modem and facsimile transceiver in order to implement a local information station mode. Digital electronic signals stored in the computer may be off-loaded to a video tape recorder by means of a video interface circuit.

6 Claims, 2 Drawing Sheets

HANDLING PROCESS AND INFORMATION STATION

BACKGROUND AND SUMMARY OF THE INVENTION

This is a continuation-in-part of application Ser. No. 870,806, entitled "Information Handling Process," filed July 5, 1986 and assigned to the assignee of the present invention.

The present invention relates generally to information and data processing. More particularly the invention relates to an information station and process for converting printed information, including typewritten and handwritten text, printed pictures, photographs and graphics, into compressed digital electronic signals for storage and retrieval using a computer-controlled video recording apparatus.

In a service and information oriented society, much effort is expended in maintaining files and records. For business reasons, tax reasons, and the like, today's businesses generate tons of paper, files, records and printed information, most of which ultimately gets stored in filing cabinets or gets shipped to warehouses. With real estate costs at a premium, warehousing costs are rising and can no longer be ignored as a cost of doing business. As the size of business or institutional record base grows, record retrieval becomes increasingly difficult, often requiring detailed inventory lists to keep track of where everything is located.

In an effort to deal with the burden of voluminous printed records, some businesses and institutions have attempted to reduce their records to microfilm. Being a photographic medium, microfilm does not lend itself well to computerized database searching techniques. Hence, while the microfilming of records does reduce the bulk of the records considerably, it does not eliminate the need for detailed inventory lists. Indeed, since the microfilmed records are too small to be browsed through with the unaided eye, some form of inventory list or index is virtually a necessity.

Where more sophisticated computerized record searching is required, some businesses and institutions have undertaken the extremely labor intensive task of retyping the records into a computer database. While this approach, although expensive, is possible for text, it is not practicable for pictures, photographs or graphics. The approach is similarly not practicable for storing documents which contain handwritten portions, such as signatures, which must be preserved in the original writers handwriting, such as on legal documents, checks, medical charts and the like.

Accordingly, using existing storage technology, many businesses and institutions have been forced to choose either the microfilm format, which is not readily computer searchable, or the retyped computer database format, which cannot easily accommodate nontext information. In many cases, neither of these approaches is considered suitable and, hence, records are still being maintained as paper files stored in filing cabinets and warehouses.

The present invention provides a process for handling information which overcomes the foregoing disadvantages. According to the inventive process, a facsimile transceiver is used to convert printed information into digital electronic signals. Unless otherwise specified, the term "printed information" will be understood to include all forms of human readable information, including but not limited to typewritten, typeset and handwritten information, photographs, graphs, graphics, blueprints, drawings, diagrams and the like. According to the process, the digital electronic signals are transmitted by serial communication link to a computer. The digital electronic signals are converted into video signals using a video interface circuit connected to and controlled by the computer. These video signals are stored using a video recording apparatus connected to the video interface circuit.

The video recording apparatus may be used to replay the stored video signals which are reconverted by the video interface circuit into second digital electronic signals. These second digital electronic signals may then be converted by a video monitor controller circuit into pixel data signals which are then routed to a video monitor for display of a facsimile of the original printed information. In the alternative, the second digital electronic signals can be routed via the communication link to the facsimile transceiver which converts the digital signals into printed information once again.

Further in accordance with the invention, a computer searchable file header containing data relating to the printed information is generated. The video interface circuit is used to convert this file header into a video file header which is then stored together with the video signals using the same video recording apparatus. This file header thus accompanies the video signals containing the digitized version of the printed information. A database may be constructed using the file header. The file header is searched by the computer to retrieve the data relating to the printed information and also to determine a storage location of the video signals on the medium of the video recording apparatus. The invention thereby permits the user to conduct a database search by searching the file header database. Password protection can be used to prevent access to sensitive documents. Once the desired document or documents have been located via the file header, they may be replayed by the video recording apparatus and converted to digital signals for display on the computer monitor or for printing a hard copy using the facsimile transceiver.

In addition to the foregoing, the invention further comprises a process for handling information using an optical scanner to convert printed information into the digital electronic signals. The digital electronic signals are then converted to video signals as described above for storage using a video recording apparatus. Hard copies of the stored information may be provided by routing the digital electronic signals to a printer connected to the computer. Data compression algorithms may be used with either approach.

The information station provided by the invention comprises a computer for receiving, storing and transmitting digital electronic signals which correspond to digitized pages of printed text and graphics. A facsimile transceiver is used to convert the printed information into digital electronic signals and to convert digital electronic signals into printed information. The computer includes a serial interface in the form of a synchronous communication circuit and modem for communicating with the facsimile transceiver. Digital electronic signals stored in the computer may be off-loaded to a video recording apparatus using a video interface circuit connected to the computer for this purpose. The information station also has a video monitor controlled by a video monitor controller circuit connected to the computer. Stored digital electronic signals are converted into pixel information for display on the monitor as human readable information.

The information station includes a switching circuit which allows the apparatus to function in three modes. In one mode the computer is connected to an external telephone line through the synchronous communication circuit and modem. This allows the computer to communicate with a remote system or facsimile transceiver in a remote station mode. A second switching state connects the facsimile transceiver with an external telephone line to allow the facsimile transceiver to send and receive fax messages. This second mode of operation provides flexibility in allowing the facsimile transceiver equipment to be used to send and receive documents when it is not being used as a component of the information station. The third switching state places the information station in a local mode in which the facsimile transceiver is connected to the computer through the modem and synchronous communication circuit.

The information station is capable of storing approximately 6,000 pages of typewritten text when digital electronic signals are singly recorded on a conventional video cassette tape. When double recording is used (each page is written twice), one video tape can hold approximately 3,000 pages. Because most data errors occur as a single bit dropout which does not significantly alter the appearance of the scanned document when it is presented on the video monitor or reprinted using the facsimile transceiver, single recording can be used in most instances. Data transfer between the hard disk of the computer and the video tape medium takes place through the computer's video interface at a rate of approximately 1,200K bytes, or approximately 20 pages per minute. The video interface also controls all tape transport and record and playback functions of the video tape recorder. The video tape recorder automatically positions to any one of the 6,000 stored documents in fast-forward and reverse speeds, giving a mean positioning time of nominally 2 minutes. Captured documents can be displayed on the computer monitor within seconds after retrieval, allowing easy keyboard control over zoom and pan features. Keyboard entered information, ASCII files and digitized documents captured by the facsimile transceiver are compressed and transmitted at nominally 9,600 characters per second. Unlike most scanners, the facsimile transceiver has a hopper that allows for unattended entry of most documents. As an added benefit, the information station makes it possible to economically master CD-ROM or optical disks by providing a convenient means for digitizing the documents to be stored on CD-ROM or optical disk. Present day CD-ROM mastering uses 9-track reel-to-reel tape, although other media such as video cassette tape may also be usable. If 9-track tape is required, the computer can be equipped with the appropriate tape handling mechanism.

For a more complete understanding of the invention, its objects and advantages, reference may be had to the following specification and to the accompanying drawing.

DESCRIPTION OF THE PREFERRED EMBODIMENTS

Figure 1:
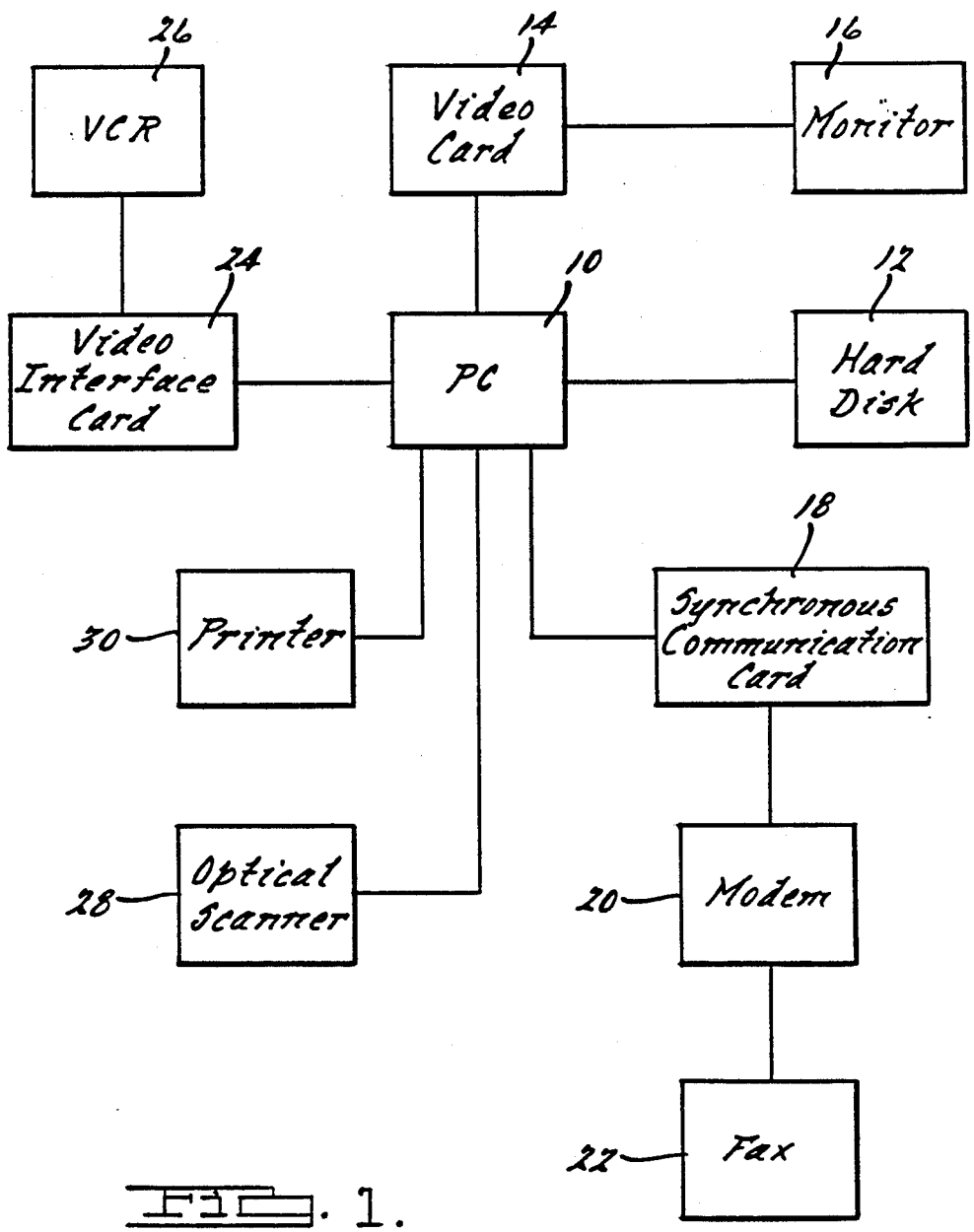
FIG. 1 illustrates a block diagram of the process for handling information in accordance with the invention.

Referring to FIG. 1, the process for handling information will be described in detail. The process employs a computer, such as a microcomputer or personal computer 10. The personal computer may include a magnetic disk medium, such as a hard disk 12. Attached to the personal computer 10 is a video card 14 which drives a video monitor 16. Preferably, the video card and video monitor are capable of displaying graphics information. A suitable personal computer for practicing the invention is an IBM Personal Computer PC, XT or AT, and the like. A suitable video card may be a video monitor controller card with graphics capability, such as the Hercules monochrome graphics card or the like. Monitor 16 can be a high resolution monochrome monitor, such as the IBM monochrome monitor available with the IBM personal computers cited above.

Connected to personal computer 10 is a synchronous communication card 18 which provides a synchronous communication link between personal computer 10 and a high speed modem 20. Communication card 18 may be a synchronous communication circuit of the type available from GammaLink Corporation. Preferably modem 20 comports with the CCITT V.29 modem standard. Preferably modem 20 provides a serial communication link at at least 9,600 baud in a synchronous fashion. Connected to modem 20 is a facsimile transceiver 22 which may be a Fujitsu Model 2010, or the like. If desired, facsimile transceiver 22 can be equipped with an automatic document feeding mechanism.

Also connected to personal computer 10 is a video interface card 24 which provides an interface and communication between the personal computer and a video recording apparatus, such as a video tape recorder or video cassette recorder 26. Preferably the video interface card 24 is a Video Memory Manager card available from Kirsch Technologies, Inc., the assignee of the present invention. This video interface card is described more fully in copending patent applications entitled "Computer Memory Back-up," Ser. No. 624,034, filed June 25, 1984, and "Computer Memory Back-Up With Automatic Tape Positioning," which is a recently filed continuation-in-part application of pending Ser. No. 624,034, the disclosures of both are hereby incorporated by reference.

Also, if desired, an optical scanner 28 and printer 30 may be connected to the personal computer 10. A suitable optical scanner is manufactured by Datacopy. Printer 30 may be a graphics printer, dot matrix printer, laser printer or the like.

In practicing the process of the invention, a printed document containing printed information is fed into facsimile transceiver 22. The facsimile transceiver encodes the document in accordance with the CCITT standard (Consulative Committee on International Telephone and Telegraph). The encoding process includes a data compression step which results in the conversion of a typewritten page of text into a digital file averaging 50K bytes. A typical picture is converted into a file of approximately 100K bytes. The facsimile transceiver thus converts the printed information into digital electronic signals. These digital electronic signals are transmitted by the serial communication link comprising modem 20 and synchronous communication card 18 to the personal computer 10. Preferably personal computer 10 is programmed to run software which allows the computer to store the digital electronic signals as data files on the computer system hard disk 12. Appropriate software is available from the GammaLink Corporation. Assuming the approximate file sizes of 50K bytes per page or 100K bytes per picture, a 10 megabyte hard disk will be capable of storing approximately 200 pages of text or 100 pictures. This estimate assumes that the entire hard disk is used for data storage. Frequently, however, the hard disk is also used to store other programs and data files; hence, in some applications, the capacity of hard disk 12 will be less than 200 text pages or 100 pictures.

In order to greatly increase the storage capacity of the system, the process further includes the step of converting the digital electronic signals into video signals using the video interface card 24. In the presently preferred embodiment, the video interface card is configured to provide data backup for the hard disk 12. Thus, if desired, the digital electronic signals from synchronous communication card 18 may be temporarily stored as data files on hard disk 12. Under control of the video interface card operating software, computer 10 reads these files from hard disk 12 and conveys the corresponding digital electronic signals to video interface card 24 which converts the digital electronic signals into video signals. The video signals are then stored using the video recording apparatus 26.

The presently preferred process, using the hardware described above, is capable of storing 150 megabytes of digital electronic signals or digital data as video signals on a single video cassette tape. At this storage density, one tape can hold approximately 3,000 pages of typewritten text or approximately 1,500 pictures or photographs. At an average cassette cost of 6 dollars, the storage cost per typewritten page is approximately 0.002 cents and the corresponding photograph storage cost is 0.004 cents. This represents a very considerable cost savings over conventional file cabinet or warehouse storage. The process is also quite space saving as well. It is estimated that the contents of two or three file cabinet drawers can be reduced to the size of a single video cassette tape. Furthermore, having reduced the records to video tape, a second video recording apparatus can be connected to the first video recording apparatus 26 to make duplicate copies of the video cassette. In this fashion, multiple copies of records can be easily produced for distribution among several users and for added security against casualty loss. The present system practicing the process described above is capable of storing nominally 6.66K bytes per second onto the video medium of video cassette recorder 26. At this rate, it may be advantageous in some applications to operate the backup procedure whereby data is transferred from hard disk to video tape as a background task of the computer. The video interface card operating software interfaces with the interrupt handling structure of computer 10 and takes control of the computer's central processing unit only when higher priority tasks, such as keyboard entry, are not being performed. In effect, by operating as a background task, the video interface card operating software implements a time-shared computer architecture.

If desired, the video interface card 24 is capable of providing an ASCII file header on the video recording medium directly adjacent to and usually preceding the recorded video data. This file header is computer searchable and may be generated to contain data about the contents of the printed page or photograph being stored on the video medium. When the stored video information is replayed and converted back into digital data, as will be discussed more fully below, the file header may be used to construct or add to a database maintained on hard disk 12 or in computer memory. The database may then be searched using conventional database searching algorithms to locate information meeting certain desired criteria. By associating the file header with a particular block of video digital data, the location of the digital data can be readily determined from the file header data. This gives the system the ability to conduct database searches based on keywords, fields or the like and to retrieve the actual digitally encoded documents from the video recording apparatus. If desired, the hard disk 12 can be used as a cache for storing selected documents from the larger store being maintained on the video medium. By establishing a hard disk cache in this fashion, the speed of the hard disk can be used advantageously to access the more frequently used documents almost instantaneously.

Having stored the information on the video medium of video recording apparatus 26, the information may be retrieved as follows. The video interface card, operating the remote control functions of the video recording apparatus, causes the video medium to fast forward or rewind to the starting location of the information to be retrieved. The video interface card then causes the video recorder to replay the stored information and the interface card converts the video information into a second digital electronic signals which convey substantially the same information as the digital electronic signals originally input to the computer via the serial communication link. The second digital electronic signals are then optionally written to hard disk 12 for temporary storage. If the user wishes to view the contents of a document or picture, the second digital electronic signals are converted by video card 14 into pixel information which is in turn used to produce a display on monitor 16. In the alternative, if a hard copy is desired, the second digital electronic signals are communicated via synchronous communication card 18 and modem 20 to the facsimile transceiver 22. Transceiver 22 then converts the digital electronic signals so received into second printed information which represents a facsimile of the original printed information.

In place of the facsimile transceiver, a similar process can be implemented by encoding the printed information using optical scanner 28. The optical scanner converts printed information into digital electronic signals which are handled by the computer 10 for storage on the video medium of video recorder 26 as described above. The optical scanner 28 does not have printing facilities to produce hard copy. However, a hard copy can be produced by routing the second digital signals to printer 30.

While the process of the invention has many uses, a few examples may be helpful in understanding the invention and its value. A publishing company might use the process to store articles and photographs of previously published articles to provide a computer searchable database useful in researching new stories and articles. Law enforcement agencies might also use the invention to maintain records, fingerprints and photographs of criminal suspects. Law firms might use the process to organize and maintain a database of documents pertinent to a pending lawsuit. Real estate brokers might also use the process to maintain multiple listing service information, including photographs of the property and factual data about the property. Hospitals and doctors' offices can store patients' medical records and charts—which often tend to be hand written. While these few examples give an idea of the utility of the invention, there are, of course, many other uses to which the process may be put.

The facsimile transceiver 22 may be a commercially available unit. As such, facsimile transceiver 22 is constructed to attach to a telephone line. The facsimile transceiver answers the telephone line if it detects a ring signal and may also have a mode of operation whereby it can attach to an external telephone transceiver, which may be used for dialing the desired number if an automatic dialing feature is not provided. In this manual dialing mode, the facsimile transceiver senses current flow through the external telephone transceiver by providing a "telephone connector" jack into which a telephone transceiver can be plugged. In the manual mode, the operator can use the external telephone to dial the desired phone number and to have a conversation with another party, in order to let that party know that a facsimile transmission is about to be sent. When the conversation is finished, a button is depressed on the facsimile transceiver to place the transceiver in control of the telephone line. Thereafter, the user can hang up the external telephone and the facsimile transmission commences. The facsimile transceiver unit uses the presence of paper in its input cradle as a signal telling the unit that it is to send a transmission. The absence of paper in the input cradle is treated as a signal that the facsimile transceiver unit is to receive a transmission.

While the invention may be practiced by connecting the facsimile transceiver 22 through a telephone line to modem 20, such practice necessitates the presence of a telephone network system through which the facsimile transceiver can dial the telephone number of the modem so as to establish communication. While such an arrangement will work, it necessitates the placing of a telephone call. In some localities, even a local telephone call is charged at a metered rate, hence it is desirable to avoid having to use the commercial telephone lines when conveying information between the facsimile transceiver and the computer 10. Also, using a commercial telephone line requires that the user, facsimile transceiver or modem dial the telephone number of the other unit and the other unit to answer. This takes time, which reduces throughput. Furthermore, in order to establish a telephone link between the facsimile transceiver and the modem, two telephone subscriptions or numbers are usually required, one to place the telephone call and the other to receive it. Finally, because the transmission is being sent via commercial lines, possibly over a great distance, the signal quality of the transmission between facsimile transceiver and modem can be degraded, with an attendant loss of information accuracy and throughput. Security can also be a problem, since the commercial telephone lines are accessible to third parties.

In order to overcome these problems, the invention employs a computer controlled switching apparatus which allows the facsimile transceiver to be directly connected to the modem. The switching apparatus has the additional advantage of allowing the facsimile transceiver to be selectively switched to an external commercial telephone line, to allow the facsimile transceiver to be used for sending ordinary messages to a remote location. The switching circuit also permits the modem to be connected to the external commercial telephone line, thereby placing the information station of the invention in a remote access condition in which digital electronic signals from the computer can be transmitted to a remote station or second facsimile transceiver.

Figure 2:
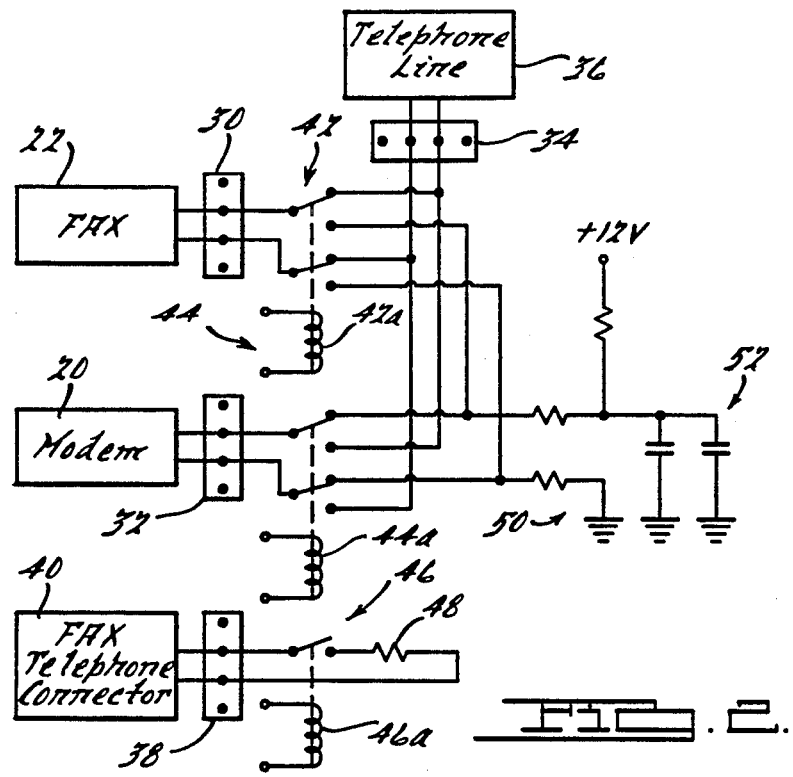
FIGS. 2 and 3 illustrate the switching circuit of the invention.
Figure 3:
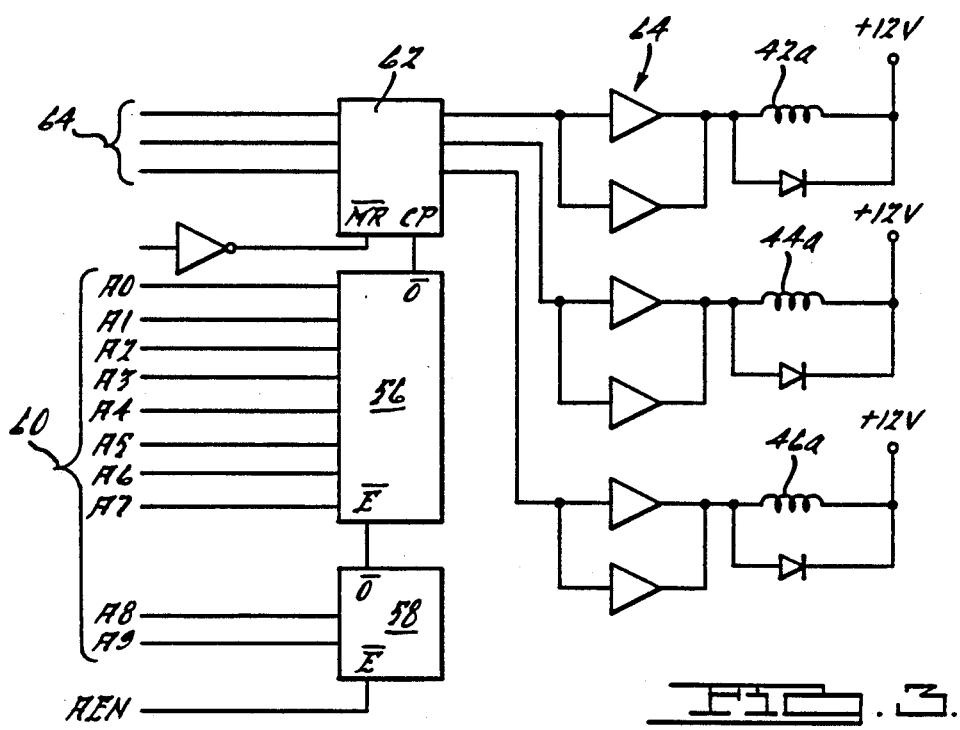

FIGS. 2 and 3 illustrate the switching apparatus of the invention. Referring first to FIG. 2, the switching circuit has a first port 30 for coupling to facsimile transceiver 22. A second port 32 is coupled to the modem 20 which together with synchronous communication card 18 comprises a serial interface for connection to computer 10. A third port 34 is adapted for connection to a telephone line depicted diagrammatically at 36. In addition, the switching circuit includes a fourth port 38 for connection to the "telephone connector" jack of facsimile transceiver 22. In FIG. 2 the telephone connector jack is depicted diagrammatically at 40.

The switching circuit further comrises a first relay 42 coupled between ports 30 and 34. A second relay 44 is coupled between ports 32 and 34. A third relay 46 is coupled to port 38 and also to a resistor 48 which provides a current path when that relay is closed, as will be more fully discussed below. Each of the relays includes a set of double pole, double throw contacts and a relay coil 42a, 44a and 46a, respectively. The relay coils are energized by a computer interface circuit illustrated in FIG. 3 and discussed below.

The switching circuit further comprises a power supply circuit 50 which is connected to a 12 volt DC source, as illustrated, and also to ground as illustrated. The supply includes noise filter capacitors 52 and is coupled to the first and second relays as illustrated.

With reference to FIG. 3, the computer interface 54 comprises address decoder circuits 56 and 58. The decoder circuits may be implemented using 25LS2521 integrated circuits. The decoder circuits are coupled to the computer address bus 60, as illustrated. A data latch circuit 62 is connected to the computer data bus 64 and may be implemented using an LS273 integrated circuit. The outputs of the data latch circuit are connected through buffer circuits 64, such as 7407 integrated circuits for driving the relay coils 42a, 44a and 46a. As illustrated, the relay coils have diode protection circuits.

In operation, the switching circuit is computer controlled by placing a predetermined address on address bus 60. The address decoders 56 and 58 decode this address and cause the data latch to strobe the data then on the data bus into the data latch. The data having been latched, the address lines can then be used for other purposes within the computer. The data latch circuit 62 decodes three bits of the latched data signal, energizing the appropriate relay coils. By placing the appropriate data bits on the data bus and by then addressing the address decoder circuits, any combination of relays 42, 44 and 46 can be energized or de-energized.

FIG. 2 illustrates the state of all three relays in the de-energized condition. As illustrated, when relay 42 is de-energized, the facsimile transceiver 22 is connected to port 34 which may in turn be coupled to telephone line 36. The 12 volt power supply 50 is not connected to the facsimile transceiver in this de-energized state. When energized, however, relay 42 switches to the alternate position, disconnecting the facsimile transceiver from port 34 and connecting it to the supply 50. Similarly, when relay 44 is de-energized, modem 20 is connected to the facsimile transceiver. When relay 44 is energized, modem 20 is connected to port 34 for coupling to the telephone line 36.

When relay 46 is de-energized, the telephone connector jack 40 of the facsimile transceiver is open circuited. When relay 46 is energized, resistor 48 is connected across the terminals of jack 40 to establish a current flow path. The current flow through the telephone connector jack of the facsimile transceiver is interpreted by the facsimile transceiver as the presence of an external telephone communicating over the telephone line which readies the facsimile transceiver for communicating. Similarly, when relay 42 is in the energized position and power supply voltage is applied to the first port 30. This simulates the connection of the facsimile transceiver to a telephone line.

In use, the switching circuit can normally assume one of three switching states to selectively connect the computer interface modem to the telephone line for transmitting computer stored information over the telephone line to a remote station or to a facsimile transceiver; or to connect the facsimile transceiver to the telephone line to allow the transceiver to transmit or receive printed information converted by facsimile transceiver into digital electronic signals for transmission over the telephone lines; or to connect the facsimile transceiver to the computer interface modem so that digital electronic information can be conveyed between the transceiver and the modem in normal information station mode.

In the first switching state, the remote information station state, the first and second relays 42 and 44 are enegized. This allows the computer interface modem to communicate with telephone line 36. In the first state, the third relay 46 is de-energized. In the second switching state, all three relays are de-energized, allowing the facsimile transceiver to communicate with the telephone line. In the third switching state, the first and third relays 42 and 46 are energized and the second relay 44 is de-energized. This permits the facsimile transceiver to communicate with the computer interface modem in local information station mode.

As explained above, these three switching states are activated under computer control by placing a predetermined signal on the computer data bus 64 which corresponds to the desired switching state and then by issuing a predetermined address on the computer address bus 60. This will cause the address decoders 56 and 58 to activate the data latch 62, which in turn energizes the appropriate relay or relays while de-energizing the others.

In practice, the data latch circuit can be configured to operate with a minimum of three data bits, each bit being indicative of the on/off state of one of the relays. The address decoder circuits 56 and 58 can be hardwired to respond to a desired address which preferably does not conflict with an existing computer memory location or peripheral device location. The selection of the particular address will be dependent upon what address ranges are available for a given computer system. While the address decoder circuits of FIG. 3 are configured to decode the first 10 address bits, it will be understood that other configurations are possible and contemplated by the invention in its broader aspects.

While the invention has been described in connection with its presently preferred embodiments, it will be understood that the invention is capable of certain modification and change without departing from the spirit of the invention as set forth in the appended claims.

What is claimed is:

1. An information station comprising:
   a computer for receiving, storing and transmitting digital electronic signals;
   a facsimile transceiver for converting printed information into digital electronic signals and for converting digital electronic signals into printed information;
   a serial interface coupled to said computer and capable of receiving said digital electronic signals produced by said facsimile transceiver;
   a switching means responsively coupled to said computer and having a first port coupled to said facsimile transceiver, having a second port coupled to said serial interface means and having a third port adapted for coupling to a telephone line;
   said switching means being responsive to said computer:
   (a) to assume a first switching state in which said serial interface is connected to said third port for enabling communication between said computer and said telephone line;
   (b) to assume a second switching state in which said facsimile transceiver is connected to said third port for enabling communication between said computer and said telephone line; and
   (c) to assume a third switching state in which said facsimile transceiver is connected to said serial interface to establish communication between said computer and said facsimile transceiver;
   whereby in said first switching state information stored in said computer may be transmitted to said telephone line, in said second switching state information converted into digital electronic signals by said facsimile transceiver may be transmitted to said telephone line, and in said third switching state information stored in said computer may be transmitted to said facsimile transceiver for conversion into printed information and information converted into digital electronic signals by said facsimile transceiver may be stored in said computer; and
   further comprising current source means responsively coupled to said computer and coupled to said facsimile transceiver for selectively providing current to said facsimile transceiver when in said third switching state for simulating the connection of a telephone line to said facsimile transceiver.

2. The information station of claim 1 wherein said switching means comprises a first relay means coupled between said first and third ports and a second relay means coupled between said second and third ports,
   wherein in said first switching state said first and second relays are energized; in said second switching state said first and second relays are de-energized; and in said third switching state said first relay is energized and said second relay is de-energized.

3. The information station of claim 2 wherein said switching means further comprises third relay means responsively coupled to said computer and coupled to a current flow path and wherein said facsimile transceiver includes a telephone connector for connection to an external telephone transceiver; said telephone connector being coupled to said third relay means and said third relay means being responsive to said computer to connect said current flow path to said telephone connector when said switching means is in said third switching state to thereby simulate connection of said telephone connector to a telephone transceiver.

4. The information station of claim 1 wherein said serial interface comprises a synchronous communication interface attached to said computer and a modem coupled to said synchronous communication interface.

5. The information station of claim 1 further comprising a video interface circuit connected to and controlled by said computer for converting digital electronic signals into video signals; and a video recording apparatus coupled to said video interface circuit for storing said video signals.

6. The information station of claim 1 further comprising video monitor controller circuit connected to said computer for converting digital electronic signals into pixel data signals and a video monitor coupled to said controller circuit for displaying said pixel data in human readable form.

* * * * *

UNITED STATES PATENT AND TRADEMARK OFFICE
CERTIFICATE OF CORRECTION

PATENT NO. : 4,816,911

DATED : March 28, 1989

INVENTOR(S) : Kerry F. Kirsch et al

It is certified that error appears in the above-identified patent and that said Letters Patent is hereby corrected as shown below:

Column 10, line 24, "computer" should read --facsimile transceiver--.

Signed and Sealed this

Thirtieth Day of May, 1995

Attest:

BRUCE LEHMAN

Attesting Officer

Commissioner of Patents and Trademarks